United States Patent [19]

Crabtree et al.

[11] 4,178,843

[45] Dec. 18, 1979

[54] PORTABLE CORN POPPER

[75] Inventors: Steven B. Crabtree, Chillicothe; Hugh F. Groth; Guilbert M. Hunt, both of Brecksville; Thomas E. Lipinski, Bath; James T. McMaster; Guy R. Moffitt, Jr., both of Chillicothe; Anthony D. Szpak, Parma; Robert A. Williams, Chillicothe, all of Ohio

[73] Assignee: Wear-Ever Aluminum, Inc., Chillicothe, Ohio

[21] Appl. No.: 875,339

[22] Filed: Feb. 6, 1978

[51] Int. Cl.² ............................................. A23L 1/18
[52] U.S. Cl. ................................... 99/323.8; 99/323.9; 426/445
[58] Field of Search ................ 99/323.5, 323.9, 323.11, 99/323.8; 426/445, 450

[56] References Cited

U.S. PATENT DOCUMENTS

| | | | |
|---|---|---|---|
| 2,421,902 | 6/1947 | Neuschotz | 99/323.5 |
| 2,602,134 | 7/1952 | Nelson | 99/323.5 |
| 2,922,355 | 1/1960 | Green | 99/323.5 |
| 3,059,567 | 10/1962 | Lindemann | 99/323.5 |
| 3,323,440 | 6/1967 | Grant | 99/323.5 |
| 3,665,839 | 5/1972 | Gottlieb | 99/323.5 |
| 4,072,091 | 2/1978 | Richardson | 99/323.11 |

Primary Examiner—Robert W. Jenkins
Attorney, Agent, or Firm—Patrick J. Viccaro

[57] ABSTRACT

An apparatus is provided for popping corn by heated air which is circulated in a cylindrical popping chamber having a vertical axis to provide a fluidized bed of swirling and circulating corn to be popped. As the corn is popped, it is lifted upwardly by the moving air and volume of popped corn to form a column of floating corn above the popping chamber and the popped corn is discharged through the open top of the chamber.

5 Claims, 6 Drawing Figures

PORTABLE CORN POPPER

BACKGROUND OF THE INVENTION

This invention relates to a method and apparatus for popping corn using heated air. More particularly, this invention relates to a portable apparatus for popping corn using heated air and using the same heated air to carry the popped kernels from the popping chamber.

The popping of corn is done most commonly by one of two methods. One method is to use oil to coat the kernels of corn prior to heating the kernels such as in a pot or kettle. Another known method of popping corn is the use of hot air passing over the kernels of corn, suspending the kernels in the hot air, and carrying the popped corn from a popping chamber to a separate location.

The latter method has several advantages over the method of popping corn using oil. One advantage is that the popped corn is oil-free which may be better for some consumers who pop corn and whose diets may restrict the use of oil. Further, the elimination of oil from popping corn minimizes the cleanup required for the corn popping apparatus. Ease of cleaning and sanitation are important considerations for food product apparatus. Kernels of corn popped using the method of passing hot air over the kernels generally results in larger popped kernels having a more uniform size. The taste is also affected in that the kernel popped to a larger size has a lighter texture. A hot air popping method thus results in a better product of popped corn in appearance and taste.

It is known in the art to provide heated air poppers for popping kernels of corn. For example, U.S. Pat. No. 2,602,134, issued July 1, 1952 to R. B. Nelson, discloses an apparatus having a high frequency dielectric heater for heating popcorn which is suspended in a funnel-shaped chamber by air flowing from the small end of the funnel to the large upper end. When the kernels of corn are popped in the funnel by the heated air, the upward flowing air expands and the velocity decreases resulting in the popped corn being carried out to the top of the funnel. U.S. Pat. No. 2,922,355, issued Jan. 26, 1960 to J. Green, also shows a corn popping apparatus wherein currents of heated air carry raw unpopped kernels upwardly to a popping zone and suspend them in that zone until the kernels are popped. The vertically oriented popping zone is an expansion zone so that popped kernels are conveyed out of that zone to another location by the same air that popped the corn.

It is also known in the prior art to provide a vertically oriented cylindrical popping chamber including a conical member upwardly projecting from the bottom of the chamber. Heated air can enter the chamber through slanted baffles or vanes around its sides to give the heated air a swirling motion to circulate the kernels until popped within the chamber. A restriction of the upper section of the popping chamber permits only the popped corn to leave the popping chamber as the unpopped kernels remain. Such an apparatus is shown in U.S. Pat. No. 3,323,440, issued June 6, 1967 to Don S. Grant. Above the restriction the air expands and the air velocity decreases such that the air carries the popped kernels of corn from the chamber leaving behind the unpopped kernels.

Further, it is known to provide a hollow body or chute attached to the top of a popping chamber to discharge popped corn into a container. Such a device, shown in U.S. Pat. No. 3,059,567, issued Oct. 23, 1962 to A. W. Lindemann, does not use the hot air popping method of popping corn, but instead, kernels of corn are heated in a popping chamber and by the reason of its own energy when popped, each piece of popped corn is delivered through the chute into a container.

Recognizing the advantages normally associated with popping corn by heated air, there still exists a need for an uncomplicated method and apparatus that can be easily used by an ordinary person without any particular mechanical skill. It is desirable that the device be portable for use in the home or elsewhere where conventional electrical outlets are available. Further, the time duration of the popping cycle from putting kernels into the device until popped corn is discharged should be short. Discharge of popped corn from the popping chamber of the device should be controlled so that popped and/or unpopped kernels are not wildly carried by the flowing air and likely to cause injury to the user. Still further, it is desirable that the device be continuously operable to provide as much popped corn as the user may want without having to shut off, or clean or handle the device.

SUMMARY OF THE INVENTION

In accordance with the present invention, kernels of corn are popped by an apparatus providing circulating heated air in a chamber and using that same air to provide a floating column of popped corn that leaves the chamber in a controlled manner to a collecting container and where the floating column of popped corn helps retain unpopped kernels within the circulating air of the popping chamber. Generally stated, the invention contemplates an apparatus for popping corn by circulating heated air within a cylindrical popping chamber. A housing is provided as well as a means for heating air within the housing. The cylindrical popping chamber is oriented with its axis vertical and is open at its upper end. Means are provided for introducing heated air into the cylindrical chamber at an angle to the chamber sidewall to cause the air to swirl in a circular path in the chamber. Means are provided for forcing heated air into the chamber at a flow rate sufficient to provide a fluidized bed of circulating corn to be popped. The rate of air flow is also sufficient to form a column of popped corn rising upwardly above the popping chamber as the corn pops. The column of popped corn floats within the chamber above the fluidized bed of unpopped corn and helps retain the unpopped kernels within the popping chamber. The air flow and volume of popped corn form a column of popped corn rising upwardly to be discharged at the upper end of the popping chamber.

DETAILED DESCRIPTION OF THE PREFERRED EMBODIMENTS OF THE INVENTION

Figure 1:
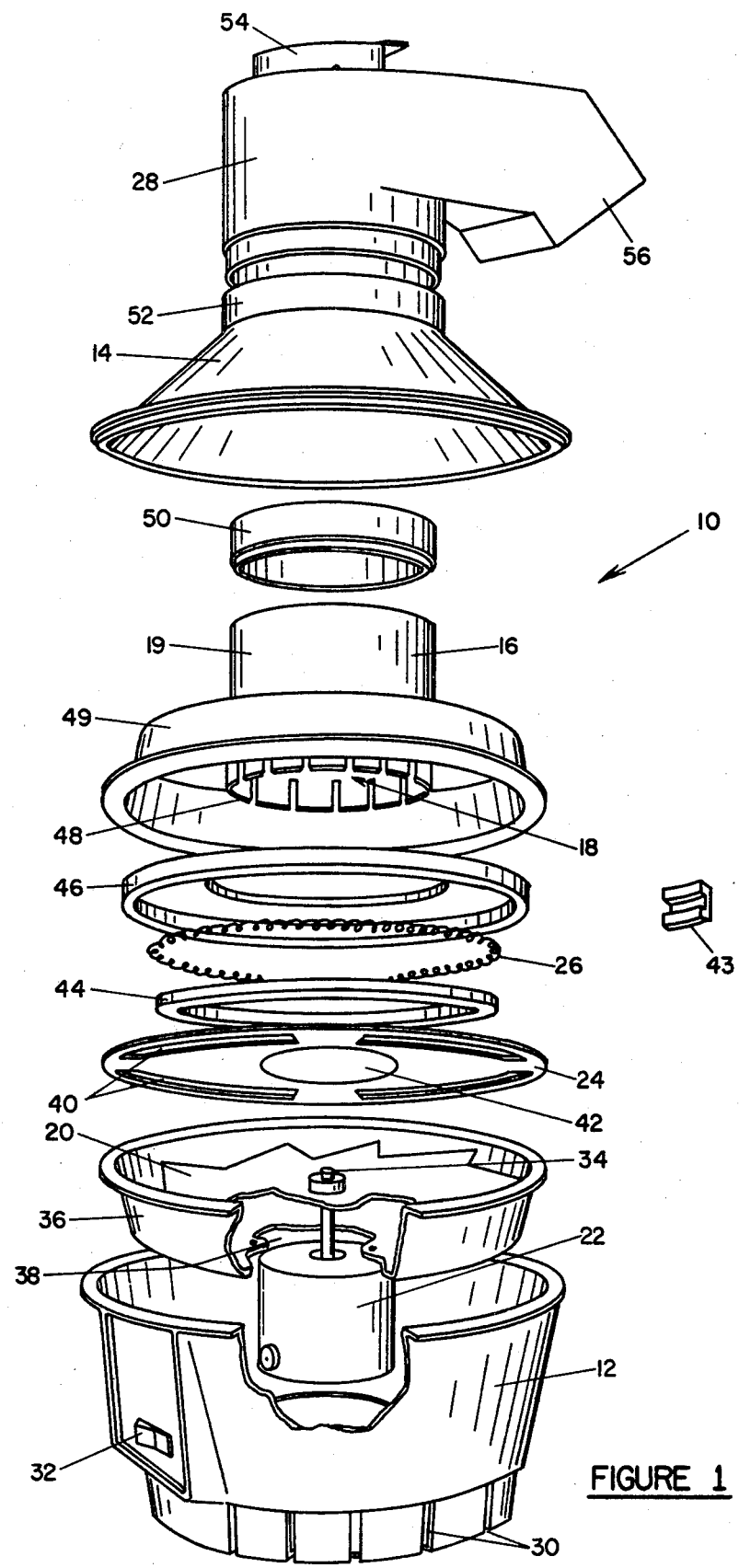
FIG. 1 is an exploded view of the preferred embodiment of the apparatus of the present invention.

FIG. 1 illustrates an exploded view of a preferred embodiment of the corn popping apparatus 10 of the present invention. The apparatus 10 includes a lower housing 12 and an upper housing 14 enclosing therebetween a heater housing 16 defining a vertical cylindrical popping chamber 18 and also enclosing a means for providing heated air to popping chamber 18 for popping kernels of corn. Heated air is provided through an air guide 24 and across heating element 26 to popping chamber 18 by a fan 20 driven by motor 22. Popped corn leaves popping chamber 18 at its upper open end in open housing 14 and may be discharged through a discharge chute 28.

Lower housing 12 is a body open on the top end and substantially closed on the bottom end and adapted to contain elements of apparatus 10 such as motor 22 and fan 20. Preferably, lower housing 12 also contains openings or slots 30 in the lower portion of the side walls of the housing near the base. The air slots 30 permit a sufficient amount of air to enter housing 12 to be forced by fan 20 through apparatus 10. Air slots 30 can be conveniently located elsewhere on housing 12. An on-off type switch 32 can also be mounted in lower housing 12 and electrically connected to motor 22.

Additionally, though not shown, lower housing 12 may provide storage space for an electrical cord for powering motor 22 or for accessories for the corn popping apparatus 10. Such accessories may include a corn kernel measuring cup.

Figure 2:
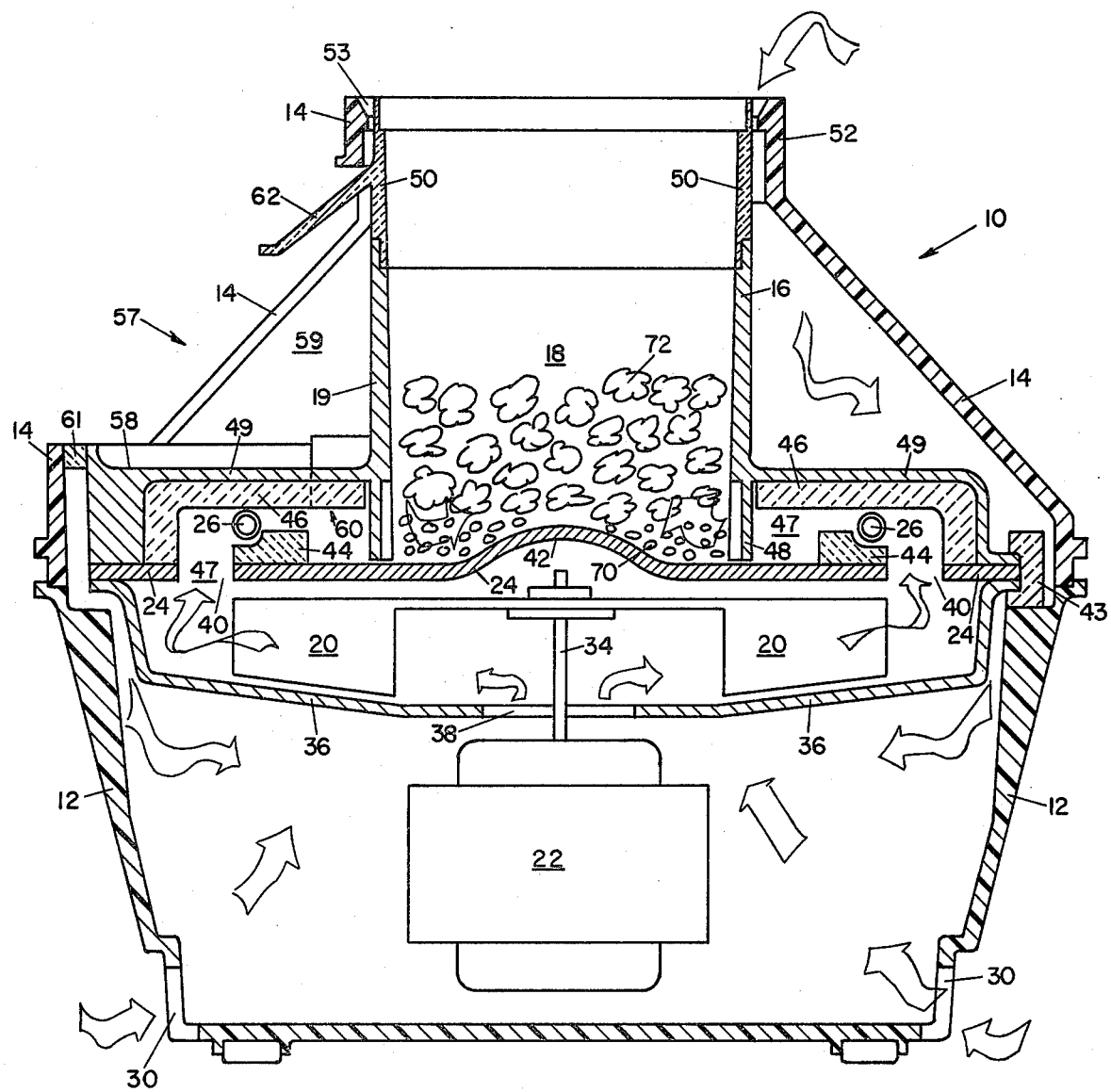
FIG. 2 is a partial cross-sectional view of a preferred embodiment of the invention.

Fan 20 may be of various designs, but preferably it has been found that a centrifugal type fan is most efficient for generating high pressures with moderate to low flow rates. Preferably, one with seven blades avoids generating low frequency vibration modes. Also, by tapering radially each of the fan blades (as shown in FIG. 2), a more efficient air flow resulting in a substantially constant cross-sectional flow is provided. Tapering also contributes to structural rigidity of the fan. In addition, a reversed scoop design of each blade can reduce the noise level and provide for a quieter operation. Fan 20 may be made of aluminum and it is directly connected to motor 22 by shaft 34.

A fan shroud or housing 36 is provided between fan 20 and motor 22 such that shaft 34 connects fan 20 with motor 22 by passing through a centrally located opening 38 in fan housing 36. As illustrated in FIG. 1, fan shroud 36 may be radially tapered or conically shaped to maintain a close clearance about the lower portion of fan blades 20 and may also provide a mounting for motor 22 near the central opening 38. The tapered or conical fan shroud 36 provides a stiffness that avoids excitation of low frequency vibration modes while providing for a near constant flow cross section with the radially tapered fan 20. In order that air entering slots 30 of lower housing 12 can be further acted on by fan 20, opening 38 may be large enough to permit the transfer of air from below shroud 36 to the fan area above the shroud. It may also be convenient to provide other openings within the body of shroud 36 for the transfer of air in addition to or instead of opening 38. Shroud 36 can be made of various materials, but preferably a metal such as aluminum will provide a lightweight, economical and sufficiently rigid structure.

Motor 22 must be selected to have the load characteristics which best match the load characteristics occurring during the operation of the corn popping apparatus 10. A universal A.C. motor can be used and it can receive its electrical power from a conventional wall plug-in type electrical cord. The motor can be of a universal type to get quick, high torque and speed on the fan. Preferably, it has been found that a motor having a 6,000 rpm at 300 g. centimeter. load or torque provides the best performance in supplying the proper air pressure and air flow to popping chamber 18. A suitable motor is one manufactured by Johnson & Associates, Ltd., Model U-52M15-110. Motor 22 must be selected to combine with fan 20 and air guide 24 to provide the proper air flow considerations which will be later described in detail. The motor may be conventionally mounted in lower housing 12 or on shroud 36, such as near opening 38.

Located vertically above fan 20 is air guide 24 having air openings or slots 40 therein. Air guide 40 is substantially a disc-shaped member and may be made of a metal such as aluminum. The slots 40 in air guide 24 permit the air to pass upwardly through guide 24 past heating element 26. As illustrated in FIG. 1, air openings 40 are located near the periphery of guide 24 so that air forced upwardly through openings 40 provides a source of air located radially outwardly of heating element 26. While air slots 40 may consist of holes or a plurality of smaller openings in guide 24, it is preferable that openings 40 be elongated slots generally arcuate in shape. Elongated openings 40 are advantageous to permit the air to substantially retain its circulatory motion caused by rotating fan blades 20.

Air guide 24 may also include a raised dome 42 integrally formed and centrally located on air guide 24. Dome 42 projects upwardly within popping chamber 18 of heater housing 16 such that unpopped kernels placed in popping chamber 18 will be displaced toward the walls of popping chamber 18. The purpose of dome 42 is to eliminate any "dead spots" within popping chamber 18 where kernels of corn may not be agitated and rotated by flowing heated air. To allow complete circulation of kernels, dome 42 must have a substantial diameter and upward projection. For example, a small bump or nipple in air guide 24 may not displace kernels sufficiently. It is preferred that dome 42 be an integral part of air guide 24 but for economic or other reasons, it may conveniently be made as a separate element of corn popping apparatus 10 or as an integral part of another component.

Heater element 26 may be an open coil wire, heater wire or some other conventional heating device. It is preferred that for the heating device to be suitable to conform to normal circuit limitations in most homes, element 26 should not draw a current of more than 15 amperes. Element 26 extends substantially around popping chamber 18 and is located radially outwardly from popping chamber 18 of heater housing 16.

In order to make corn popping apparatus 10 with external upper and lower housings 14 and 12, respectively, that are not too hot to the user's touch during operation, the proper amount of heat insulation must be provided. Ceramic insulators 44 and 46 are generally ring shaped and designed to contain heating element 26 therebetween. When assembled, as later described in FIG. 2, there is a space 47 between lower ceramic insulator 44 and upper ceramic insulator 46 such as to allow air to flow across heating element 26 radially inwardly toward popping chamber 18. The flowing air also has a larger circulatory motion due to rotating fan 20. Thus, as air to be heated flows radially toward chamber 18, the air is caused to follow a generally circular path about the periphery of chamber 18 in space 47. Preferably, lower ceramic insulator 44 has an outside diameter smaller than the diametrical locations of air openings 40 in air guide 24. Preferably, upper ceramic insulator 46 has an inside diameter larger than the diametrical location of air openings 40 in air guide 24, thus defining space 47 between the insulators to allow air passage.

Heater housing 16 includes a cylindrical body 19 having therein a cylindrical chamber 18 for popping corn. Chamber 18 is oriented with its longitudinal axis in the vertical direction. As illustrated in FIG. 1, the lower portion of the cylindrical body of heater housing 16 has a plurality of slanted vanes or baffles 48 oriented at an angle for allowing access of forced heated air into popping chamber 18. Slanted baffles 48 must all be oriented in the same direction on the lower cylindrical wall of heater housing 16 in order that air entering chamber 18 is given a swirling motion either in the clockwise or counterclockwise direction to follow a generally circular path about the longitudinal axis of cylindrical chamber 18. Additionally, the space or openings between adjacent vanes 48 should be small enough to prevent kernels from passing therethrough and leaving chamber 18. It has been found that an opening of 0.09 inch is small enough to prevent kernels from getting into the moving parts and heating elements of apparatus 10. Though it is not shown, air may be caused to circulate within chamber 18 by other means, such as slanted openings, in the sidewalls of chamber 18 instead of vanes 48.

Preferably, heater housing 16 also includes an annular flange 49 extending substantially the entire circumference about the cylinder portion of heater housing 16. Annular flange 49 projects radially outwardly and bends to terminate projecting downwardly. The downwardly facing concave structure formed by annular flange 49 on heater housing 16 facilitates directing of the forced air from fan 20 through slanted baffles 48.

The interior diameter of the cylindrical portion of heater housing 16 should be approximately equal at the lower portion of the cylinder as at the upper portion of the cylinder. Preferably, there is a gradual increase in the diameter of the cylinder at the upper portion. Such a gradual increase facilitates the prevention of jamming of popped kernels of corn to be discharged while reducing the kernel velocity near the exit opening at the upper portion of popping apparatus 10. Additionally, the increase in diameter improves the air flow path allowing emptying of the popping chamber 18. Suitably, heater housing 16 can be made of a cast aluminum material or various other materials that are heat conductive.

A plurality of spacer clips 43 hold together shroud 36, air guide 24 and heater housing 16 at the periphery of those elements, as better shown in FIG. 2. Clips 43 should be made of a heat resistant and thermally insulating material, such as a phenolic, so heat is not conducted to outer housings 12 and 14. Additionally, clips 43 can be arranged to allow a space about the periphery of the joined elements (16, 24 and 36) so there is no direct contact of elements 16, 24 and 36 with housings 12 and 14. The space also permits the flow of air between the periphery of elements 16, 24 and 36 and housings 12 and 14.

Near the upper portion of heater housing 16 in FIG. 1, a collar 50 may be located. Collar 50 may facilitate fitting of the upper portion of heater housing 16 within upper housing 14. While collar 50 may form a snug fit between housings 16 and 14, it is preferred that collar 50 be joined on the upper portion of heater housing 16 and that collar 50 not contact upper housing 14. An annular space 53 between collar 50 and housing 14, as shown in FIG. 2, permits additional flow of air into corn popping apparatus 10.

Collar 50 connects heater housing 16 to chute 28 in FIG. 1. Collar 50 also acts as an extension of popping chamber 18 of housing 16. Preferably, collar 50 is made of a heat resistant, thermally insulating material, such as a phenolic, to substantially eliminate any conduction of heat from heater housing 16 to chute 28 and upper housing 14.

FIG. 1 also shows upper housing 14 having a substantially cone-shaped configuration open downwardly such that when assembled, housings 12 and 14 enclose all moving and heated elements of the corn popping apparatus therebetween. The upper portion of upper housing 14 includes a cylindrical body 52 which generally conforms to the shape of collar 50 and cylindrical body 19 of heater housing 16 and may act as an extension of popping chamber 18. Preferably, heater housing 16 is connected to chute 28 by collar 50 so cylinder 52 of upper housing 14 is not an extension of chamber 18 but is only a noncontacting surrounding housing as shown in FIG. 2.

FIG. 1 further illustrates chute 28 located above and attachable to collar 50. As illustrated, chute 28 also includes a cylindrical body portion which acts as an extension of the popping chamber 18 of heater housing 16 and terminates in a discharge area 56 for removal of popped corn. Preferably, discharge area 56 is located away from the longitudinal axis of the cylindrical body of heater housing 16 extending upwardly through chute 28. Discharge area 56 may provide for a single discharge location, a plurality of locations, or for discharge about entire apparatus 10.

Figure 1A:
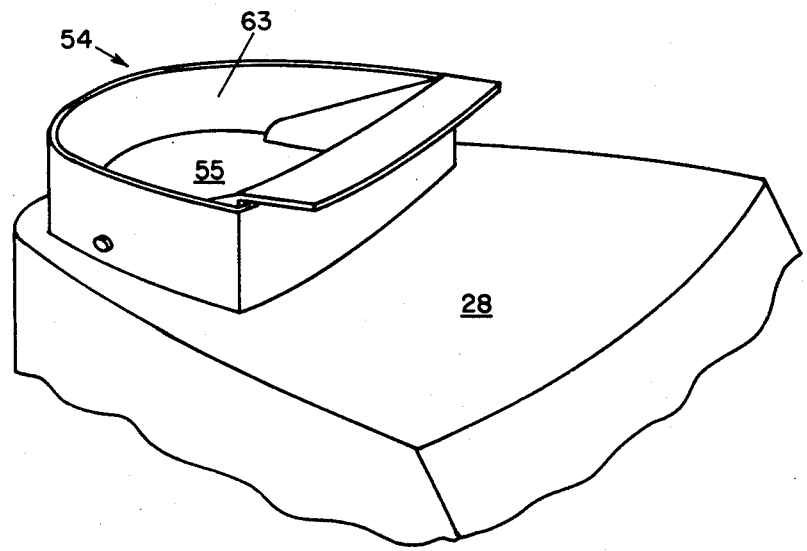
FIG. 1a is a perspective view of a top portion of the present invention.

Chute 28 is also shown to have a dump means 54 located above the vertical cylinder formed by chamber 18, collar 50 and chute 28. Dump means 54 can be used so unpopped kernels of corn can be placed therein and then dumped into popping chamber 18 of heater housing 16, as better shown in FIG. 1a. Preferably, means 54 may include a door 55 and hopper 63 arranged to provide a metered amount, for example one cup, of unpopped kernels into the corn popping apparatus 10. FIG. 1a is a top perspective showing dump means 54 having door 55 hingeably attached within hopper 63. When closed, door 55 and hopper 63 can contain a predetermined amount of corn. When door 55 is opened, corn contained in hopper 63 falls downwardly into chamber 18.

Housings 14 and 12 and chute 28 can be made of various materials. Preferably, upper housing 14, lower housing 12, and chute 28 are made of a plastic material. Housings 12 and 14 can suitably be made from a polypropylene and chute 28 can suitably be made from a transparent plastic material such as TPX, polymethylpentene, so that popped kernels of corn can be visible to the operator of corn popping apparatus 10 prior to discharge.

FIG. 2 illustrates a partial cross-sectional view of the present invention showing the exploded view of FIG. 1 in an assembled condition. Motor 22 is located within lower housing 12 and is connected by shaft 34 to fan 20 which is also located within lower housing 12 within fan shroud 36. Fan shroud 36 has central opening 38 which allows for the passage of air by fan 20 to air openings 40 in air guide 24. Air openings 40 are shown radially outwardly from the heating element 26 located between ceramic insulators 44 and 46. The arrangement of insulators 44 and 46 permits radial and circular passage of air across heater element 26 to slanted baffles 48 of heater housing 16. Annular flange 49 of heater housing 16 is located above and radially outwardly of ceramic insulators 44 and 46 to facilitate directing air flow radially inwardly. Heated air entering popping chamber 18 through slanted vanes 48, follows a generally circular path within chamber 18 about upwardly projecting and centrally located dome 42 of air guide 24. All of slanted vanes 48 are oriented generally at the same angle within the lower sidewalls of chamber 18 to cause the heated air to swirl.

As illustrated in FIG. 2, air enters corn popping apparatus 10 through air slots 30 of lower housing 12 and through annular space 53 between collar 50 and cylindrical portion 52 of upper housing 14. Air entering from annular space 53 flows downwardly over the outside surface of heater housing 16 between housing 16 and upper housing 14. The air passes downwardly about the periphery of shroud 36, air guide 24 and heater housing 16 joined together by clips 43 to the area below shroud 36. There the air mixes with air entering through slots 30, passes through opening 38 and is then acted upon by fan 20. Air entering through annular space 53 can be slightly heated by heater housing 16 when it is warm from prior usage, and can cool upper housing 14 and eliminate radiation heating by heater housing 16.

Though FIG. 2 illustrates a preferred embodiment, it is within the scope of this invention that the assemblage of parts comprising corn popping apparatus 10 may provide various interconnected passageways for the flow of air into and within apparatus 10 for heating air while also cooling external elements of apparatus 10.

FIG. 2 further illustrates an additional feature that may be provided with a preferred embodiment of the present invention. An access opening 57 may be provided for in upper housing 14 to permit access to some of the heat generated by corn popping apparatus 10 to melt comestibles, such as butter and margarine. The left side of FIG. 2 illustrates annular flange 49 having a recess 58 that is adaptable for receiving a container for melting butter in the container. Such a container 64 (as shown in FIGS. 3 and 3a) may be placed on recess 58 and heated conductively by heater housing 16.

Additionally, to provide an improved melting of butter, an air tap can be provided to draw off some flow of heated air after the air passes heater element 26. A small vertical opening can be provided through annular flange 49 and upper ceramic insulator 46 as illustrated by reference number 60. Heated air tapped off through opening 60 can be redirected downwardly into a container by also providing a deflector 62 projecting outwardly and downwardly from phenolic collar 50. Deflector 62 may be integral with collar 50.

Figure 3:
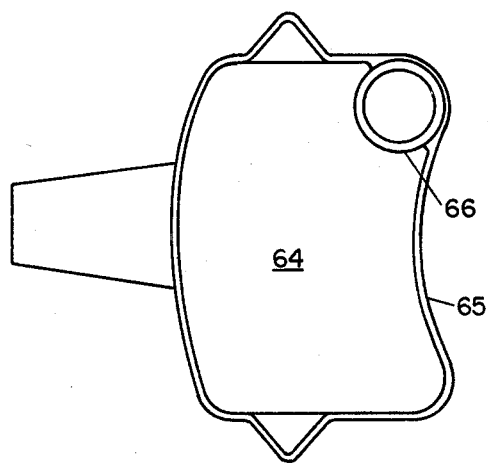
FIGS. 3 and 3a are top and end views of an alternate feature of the present invention.
Figure 3A:
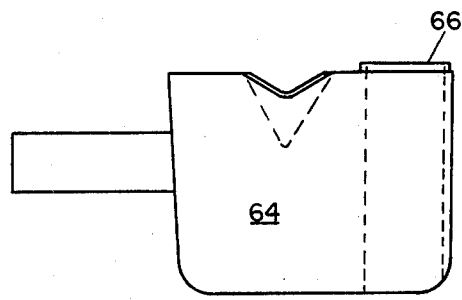

FIGS. 3 and 3a illustrate container 64 for melting comestibles. Container 64 is adapted to be located within access open area 57 of housing 14 and to be placed on recess 58 of heater housing 16. Container 64 must be of a heat conductive material and it acquires heat conductively by resting on recess 58 of heater housing 16. Additionally, container 64 may be conformed to contact cylindrical body 19 of housing 16 to conduct more heat to container 64 for melting comestibles, such as by curved wall 65 of container 64. Container 64 may also include an integral tubular section 66 that can be aligned with air tap opening 60 to permit passage of heated air from within popping apparatus 10 upwardly therethrough to be redirected downwardly by deflector 62 into container 64 for melting butter and the like. Additionally, air passing through tubular section 66 of container 64 heats the container and provides an additional source of heat for melting comestible.

By the above arrangement, comestibles can be melted within container 64 by conductive heat and primarily by tapping heated air from the apparatus 10 and directing it into container 64. The ceramic insulators 46 located below annular flange 49 of heater housing 16 substantially eliminates any excessive hot areas in the vicinity of heating element 26 which could be a hazard to an operator and which would radiate excessive heat to the outer plastic housing 14. By making collar 50 and deflector 62 of a heat resistant, thermally insulative material, there is the added advantage that there is substantially no heat loss or heat exchange of the air with deflector 62. The temperature of the air reaching the comestibles within container 64 is therefore more constant.

Access opening 57 in upper housing 14 may also be provided with walls 59 to prevent excessive air flow into housing 14 through opening 57 which may excessively cool heater housing 16. Walls 59 help keep adequate air flow in upper housing 14 through annular space 53. Further, providing walls 59 minimizes any hazard of the user of apparatus 10 being accidentally burned by touching heater housing 16. Walls 59 may be made of various materials, preferably a heat resistant, thermally insulative material such as a phenolic. Further, FIG. 2 illustrates spacer 61 for thermally insulating recess 58 of heater housing 16 from contacting outer housing 14.

The butter melting arrangement of the present invention is advantageous in that there is no auxiliary heating unit which would add to the cost of the corn popping apparatus and to its complexity for melting butter and the like. Tapping a portion of the heated air supply provides an efficient way to use any excess heat that is generated by the corn popping apparatus.

Figure 4:
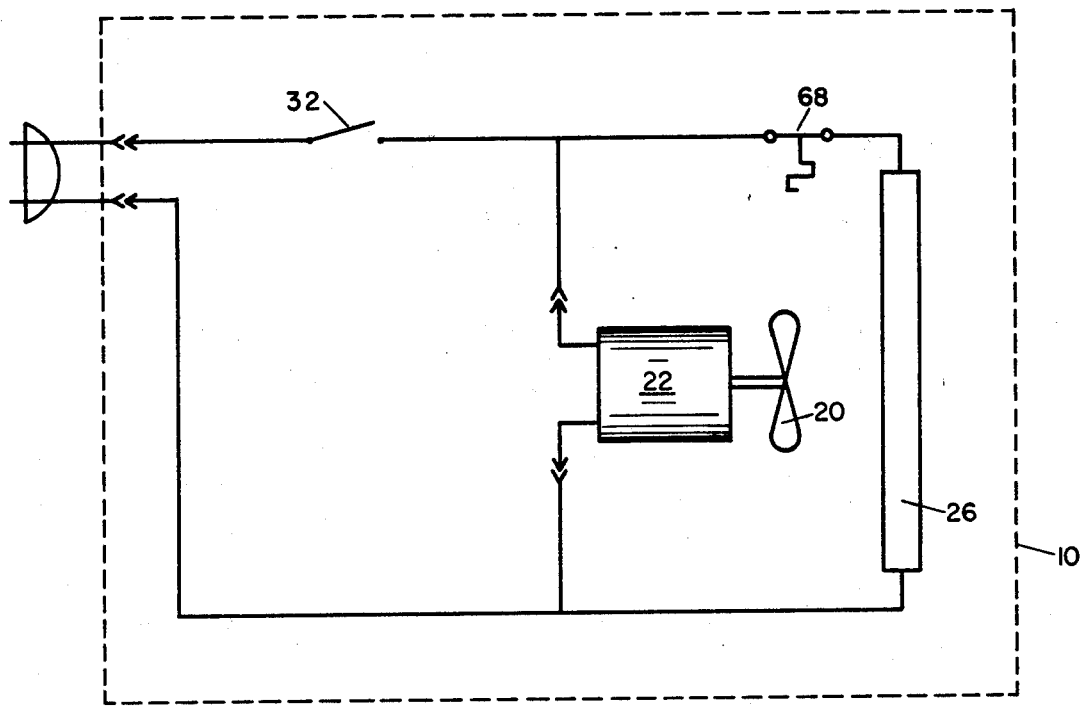
FIG. 4 is a schematic of an electrical circuit of the present invention.

FIG. 4 is a schematic of an electrical circuit of the present invention. Corn popping apparatus 10 can be powered electrically by plugging it into a conventional household outlet supplying 120 volts. In addition to the on-off switch 32, which may be located on lower housing 12, and motor 22 powering fan 20 to blow air across heating element 26, there may be at least one means for thermally controlling apparatus 10, such as thermal devices and thermostat 68. Thermal controls are safety features to cut off the electrical power to motor 22 and/or heating element 26 in the event of an unusually high temperature buildup within apparatus 10. Preferably, a thermostat 68 is arranged in the circuit to cut off electrical power to heating element 26 while allowing motor 22 to continue to operate fan 20 to flow cooling air through apparatus 10. Similarly, a thermal device can be provided as a part of motor 22 to cut off electrical power to the motor in the event of an overheating condition.

The use and operation of the corn popping apparatus can be more completely understood by referring to both FIGS. 1 and 2. A predetermined amount of unpopped kernels of corn 70 can be placed into the corn popping apparatus 10 through dump means 54 on chute 28. Door 55 is manually lifted upwardly on one end to cause the unpopped kernels within hopper 63 to fall into cylindrical popping chamber 18 about the external surface of dome 42 of air guide 24. When kernels of unpopped corn are placed in popping chamber 18, the motor may already be turned on by switch 32 or, optionally, motor 22 can be turned on after placing kernels into popping chamber 18.

As motor 22 turns shaft 34, fan 20 will be caused to rotate and air will be drawn in through air openings 30 in lower housing 12 and annular space 53 at the top of upper housing 14. Air from annular space 53 cools upper housing 14 and the air will be heated slightly from any heat radiating from housing 16. The slightly heated air passes about the periphery of housing 16 past spacer clips 43 to mix with other air. The air will be drawn through central opening 38 of fan shroud 36 and will move radially outwardly along the blades of the fan 20 to be forced through air opening 40 in air guide 24. The moving air within space 47, having primarily a circular motion caused by fan 20, will pass between ceramic insulators 44 and 46 and across heating element 26 to be heated before entering popping chamber 18 through slanted baffles 48. The air continues to follow a circular path within space 47 as it moves radially inward toward baffles 48. The rate of heat transfer to the circulating air is efficient due to the repetitive passing of the air over heating element 26 and heated insulators 44 and 46.

As the heated air passes through slanted baffles 48, it is caused to circulate within popping chamber 18 with a swirling motion resulting in mixing, lifting and suspending unpopped kernels of corn in the hot air until the kernels pop. Preferably, the angular vanes 48 are arranged to swirl the air within chamber 18 in the same circular direction (clockwise or counterclockwise) that the air was caused to circulate by fan 20. Such an arrangement enhances the swirling within chamber 18. The heated air which agitates and circulates unpopped kernels of corn 70 creates a fluidized bed of corn circulating within the lower portion of chamber 18 about dome 42. The fluidized bed of unpopped kernels allows for uniform heating of kernels by causing each kernel 70 to swirl within chamber 18 and each to rotate about its own axes. As the air continues to circulate unpopped kernels of corn 70 within popping chamber 18, the kernels of corn which reach the popping temperature are popped and, being less dense, are lifted or caused to float on the fluidized bed of unpopped kernels. As more and more kernels pop, it is the circulating air and the volume of popped corn 72 which produces a floating column of popped corn 72 rising upwardly relatively slowly within popping chamber 18 to allow popped corn to be discharged to a specific location such as a collecting container. The column of popped corn 72 is formed as the corn 70 pops and fills the circular cross-sectional area of popping chamber 18. Additional corn then pops to fill the cross-sectional area of chamber 18 and to push upwardly already popped corn 72 above it. The column forms as successive kernels 70 pop and the column floats on the swirling air and unpopped corn 70 adjacent therebelow.

For discharge of popped corn 72, chute 28 need not always be used but when chute 28 is used, the height of the chute is critical. If the column of floating popped corn is allowed to get too high, the popped corn will not be efficiently discharged and will jam within the column. The height of the column of popped corn, however, can be high enough to provide an advantage that the floating column of popped corn 72 helps retain unpopped kernels 70 within popping chamber 18. Unpopped kernels 70 may have a tendency to be carried upward by popped kernels. By providing a high enough column, the unpopped kernels can dislodge themselves from the popped corn and fall back into chamber 18.

Unpopped kernels of corn 70 in chamber 18 will continue to circulate until most, if not all, are popped. Near the end of the popping cycle when there are only relatively few unpopped kernels remaining in chamber 18, the column of floating popped corn 72 continues to slowly rise above chamber 18 almost entirely by the force of the swirling and circulating air within the chamber. At that stage of the cycle, the volume of corn being popped is reduced to a minimum level and the effect on the rising column of corn is due to air flow only.

Simultaneously with the popping of the corn, butter and the like may be melted at access opening 57 by the placement of container 64 in recess 58. At the end of the first popping cycle, which may take from 4 to 5 minutes, the butter is melted and ready to be poured over and mixed with the popped corn. One popping cycle can be considered to include the operations from dumping corn 70 into chamber 18 until all or most of the corn is popped and discharged. If the apparatus is used continuously, i.e. reloaded immediately for a second popping cycle, the total time for complete popping is reduced. A second popping cycle may take 3 to 4 minutes and the third cycle may take as little as 2 minutes. The popping cycle for apparatus 10 may range from as low as 2 to 5 minutes depending on how hot the apparatus is from previous use.

The function of the corn popping apparatus of the present invention requires a balance of the pressure and force of the circulating, swirling air, the temperature of the air, and the chamber size and shape. Such a balance provides swirling unpopped kernels of corn 70 in a generally circular path as a fluidized bed of corn 70 and the controlled rise of a column of popped corn 72 for discharge. In addition to the thorough and constant agitation of corn kernels 70 which are necessary for proper popping, it has been found that there must also be a controlled air pressure at the slanted baffles 48 in the heater housing 16. Too much air pressure is detrimental to proper popping in that excessive air flow and total pressures create a cooling effect. The air entering the popping chamber would agitate the corn well, but the temperature would be too low to pop the corn properly. The temperature of air within chamber 18 should be at least 400° F. Also, excessive air flow would cause unpopped kernels 70 to be expelled from chamber 18. Therefore, without having to increase the wattage or current of the heating element 26, it has been found that a total air pressure of 4.5 to approximately 6.0 inches of water measured at the tip of fan blade 20 near opening 40 of guide 24 achieves satisfactory popping performance. It has been found that a total air pressure of 1.5 to 3 inches of water is satisfactory inside popping chamber 18. That pressure is measured against the flow of air at the places where it enters chamber 18 through baffles 48. The motor-fan combination previously described was found to be suitable to provide those total pressures.

If apparatus 10 is operating without corn kernels 70 in chamber 18, the air flow discharge rate from chamber 18 is high and it keeps the apparatus relatively cool but ready for popping. When corn is dumped into chamber 18, corn 70 restricts the air flow resulting in a hotter air condition within chamber 18 suitable for popping corn. As corn pops, the combined effect of unpopped corn 70 and popped corn 72 restricts air flow to maintain the hotter air condition. After all the corn 72 (or most, if not all is popped) is discharged, the air again flows at a higher discharge rate and thus a cooler air condition.

Additional air flow considerations include the configuration of the slanted baffles 48. While distance between adjacent slanted vanes or baffles 48 must be small enough to prevent corn kernels from escaping popping chamber 18, it has been found that providing spacing of about 0.09 inch between adjacent slanted baffles provides proper circulation and corn kernel agitation within popping chamber 18.

The desired air flow characteristics to provide a fluidized bed of unpopped kernels and a floating column of popped corn depend also on the dimensions of the popping chamber 18 and the chute 28 above chamber 18 due to the volume of unpopped kernels and popped corn which is being circulated, suspended and popped. For example, a model of corn popping apparatus 10 of the present invention includes a heater housing 16 having an internal diameter of the cylindrical portion 19 of about 2¾ inches. The height of the cylindrical portion 19 from the bottom of slanted baffles 48 to the upper portion may be 2.5 inches. The collar 50 provides an additional 1½ inches to the column height. Chute 28 may have an internal diameter of the cylindrical portion of slightly greater than 2¾ inches and a height of the cylindrical portion from the lower portion to the bend for the discharge area 56 of about 1½ inches. Effectively, the assembled corn popping apparatus 10 will have a cylindrical column of about 5¼ inches as measured upwardly from air guide 24.

The corn popping apparatus thus provides an uncomplicated automated apparatus for popping corn using heated air. The popped corn is discharged in a controlled manner and does not rapidly or wildly exit the popping chamber. Corn can be popped oil-free, which is better for people on certain diets and which facilitates easy cleanup. Further, there is the advantage that the corn is popped with heated air using the optimum combination of wattage and air flow. There is a further advantage in that the corn popping apparatus can be reloaded without any cleaning of the popping chamber when most of the kernels are popped and the column of popped corn has been discharged. Effectively, there can be a continuous operation of the present invention by dumping additional unpopped kernels into the chamber without shutting off the motor and fan.

Having thus described the invention, what is claimed is:

1. An apparatus for popping corn by heated air comprising:
 a housing;
 means for heating air;
 a cylindrical popping chamber within said housing having its axis vertical, said chamber being open at the top and having its diameter larger at its upper portion than at its lower portion;
 means for flowing air in a generally circular path about the outside periphery of said chamber to facilitate heating of the air; and
 means for introducing heated air into the lower portion of said chamber to flow the air within the chamber into a generally circular path about said axis to provide a fluidized bed of corn to be popped moving in a generally circular path within said chamber;
 the air controlled to retain popped corn within said chamber to form a column of popped corn rising upwardly above said popping chamber and to be discharged out the open top of said chamber in a controlled manner.

2. In an apparatus for popping corn by heated air and using said same air to transfer popped corn from said apparatus having a housing, means for heating air, a cylindrical popping chamber disposed with its axis in the vertical plane, a raised member projecting upwardly from the base of said chamber, and slanted vanes defining openings in said chamber near the bottom of said popping chamber and said vanes disposed for introducing heated air therethrough for following a circular path within said chamber, wherein the improvement comprises:
 popping chamber means open at its upper end and having a diameter at the upper end larger than the diameter of the popping chamber at said slanted vanes;
 means for flowing air in a generally circular path around the outside of said chamber to facilitate efficient heating of the air; and
 means for introducing heated air into said popping chamber to provide a fluidized bed of corn to be popped, said corn moving in a generally circular path within said chamber, and
 forming a floating column of popped corn rising upwardly above said popping chamber as the corn is being popped and discharging the popped corn in a controlled manner from the open end of said chamber.

3. Apparatus for popping corn comprising:
 a cylindrical popping chamber having a vertical axis and an open top end for exit of popped corn therethrough, said chamber further having openings through its sidewall near the lower end thereof and slanted vanes in the openings for directing air into a circular path in the popping chamber, said chamber having a diameter at the top end larger than the diameter at the lower end;
 means for heating air;
 means for flowing air in a generally circular path about the outside periphery of said chamber to facilitate heating of the air; and
 means for blowing the heated air through said openings in the sidewall of the chamber inwardly into said chamber in a circular path as directed by said vanes to fluidize corn in the chamber so the corn will be popped by the heated air and will form a rising column of popped corn to be expelled through said open top end of the chamber.

4. An apparatus for popping corn by heated air comprising:
 a housing;
 means for heating air;
 a cylindrical popping chamber within said housing having its axis vertical, said chamber being open at the top and having its diameter larger at its upper portion than at its lower portion;
 means for introducing heated air into the lower portion of said chamber to flow the air within the chamber into a generally circular path about said axis to provide a fluidized bed of corn to be popped moving in a generally circular path within said chamber;

the air controlled to retain popped corn within said chamber to form a column of popped corn rising upwardly above said popping chamber and to be discharged out the open top of said chamber in a controlled manner; and a means for providing a portion of heated air and directing the air to a container for heating comestibles.

5. An apparatus for popping corn by heated air comprising:

a housing;

means for heating air;

a cylindrical popping chamber within said housing having its axis vertical, said chamber being open at the top and having its diameter larger at its upper portion than at its lower portion;

means for introducing heated air into the lower portion of said chamber to flow the air within the chamber into a generally circular path about said axis to provide a fluidized bed of corn to be popped moving in a generally circular path within said chamber;

the air controlled to retain popped corn within said chamber to form a column of popped corn rising upwardly above said popping chamber and to be discharged out the open top of said chamber in a controlled manner; and a means generally above said chamber for providing metered amounts of corn into said chamber and to permit continuous popping of corn, said means includes a container for holding an amount of corn and for dumping the corn substantially downwardly into said chamber.

* * * * *

UNITED STATES PATENT AND TRADEMARK OFFICE
Certificate

Patent No. 4,178,843                          Patented December 18, 1979

Steven B. Crabtree, Hugh F. Groth, Guilbert M. Hunt, Thomas E. Lipinski, James T. McMaster, Guy R. Moffitt, Jr., Anthony D. Szpak and Robert A. Williams Application having been made by Steven B. Crabtree, Hugh F. Groth, Guilbert M. Hunt, Thomas E. Lipinski, James T. McMaster, Guy R. Moffitt, Jr., Anthony D. Szpak and Robert A. Williams, the inventors named in the patent above identified, and Wear-Ever Aluminum, Inc., the assignee, for the issuance of a certificate under the provisions of Title 35, Section 256, of the United States Code, deleting the names of Steven B. Crabtree, James T. McMaster, Guy A. Moffitt, Jr., and Robert A. Williams as joint inventors, and a showing and proof of facts satisfying the requirements of the said section having been submitted, it is this 22nd day of Sept. 1981, certified that the names of the said Steven B. Crabtree, James T. McMaster, Guy R. Moffitt, Jr., and Robert A. Williams are hereby deleted from the said patent as joint inventors with the said Hugh F. Groth, Guilbert M. Hunt, Thomas E. Lipinski and Anthony D. Szpak.

FRED W. SHERLING
*Associate Solicitor.*